United States Patent [19]

Lopes

[11] Patent Number: 5,683,579
[45] Date of Patent: Nov. 4, 1997

[54] MAGNETIC FLUID CONDITIONER AND SEPARATION APPARATUS

[75] Inventor: William Steven Lopes, Fullerton, Calif.

[73] Assignee: Liquid Separation, Inc., Fullerton, Calif.

[21] Appl. No.: 777,742

[22] Filed: Dec. 20, 1996

Related U.S. Application Data

[63] Continuation-in-part of Ser. No. 340,907, Nov. 15, 1994, abandoned.

[51] Int. Cl.$^6$ .................................................. C02F 1/48
[52] U.S. Cl. ............................................ 210/222; 210/243
[58] Field of Search .................................. 210/222, 223, 210/243, 695; 361/215

[56] References Cited

U.S. PATENT DOCUMENTS

| | | | |
|---|---|---|---|
| 2,652,925 | 9/1953 | Vermeiren | 210/222 |
| 4,265,746 | 5/1981 | Zimmerman, Sr. et al. | 210/222 |
| 4,490,252 | 12/1984 | Brigante | 210/222 |

Primary Examiner—Matthew O. Savage
Attorney, Agent, or Firm—Stuart W. Knight

[57] ABSTRACT

A device for separation of metals and inorganic or organic fluids from water is provided which is comprised of a pipe containing a core concentric within the pipe; several magnets containing segments of opposite poles arranged exterior to the pipe; and an electrically conductive wire connected electrically to the core and to ground.

4 Claims, 2 Drawing Sheets

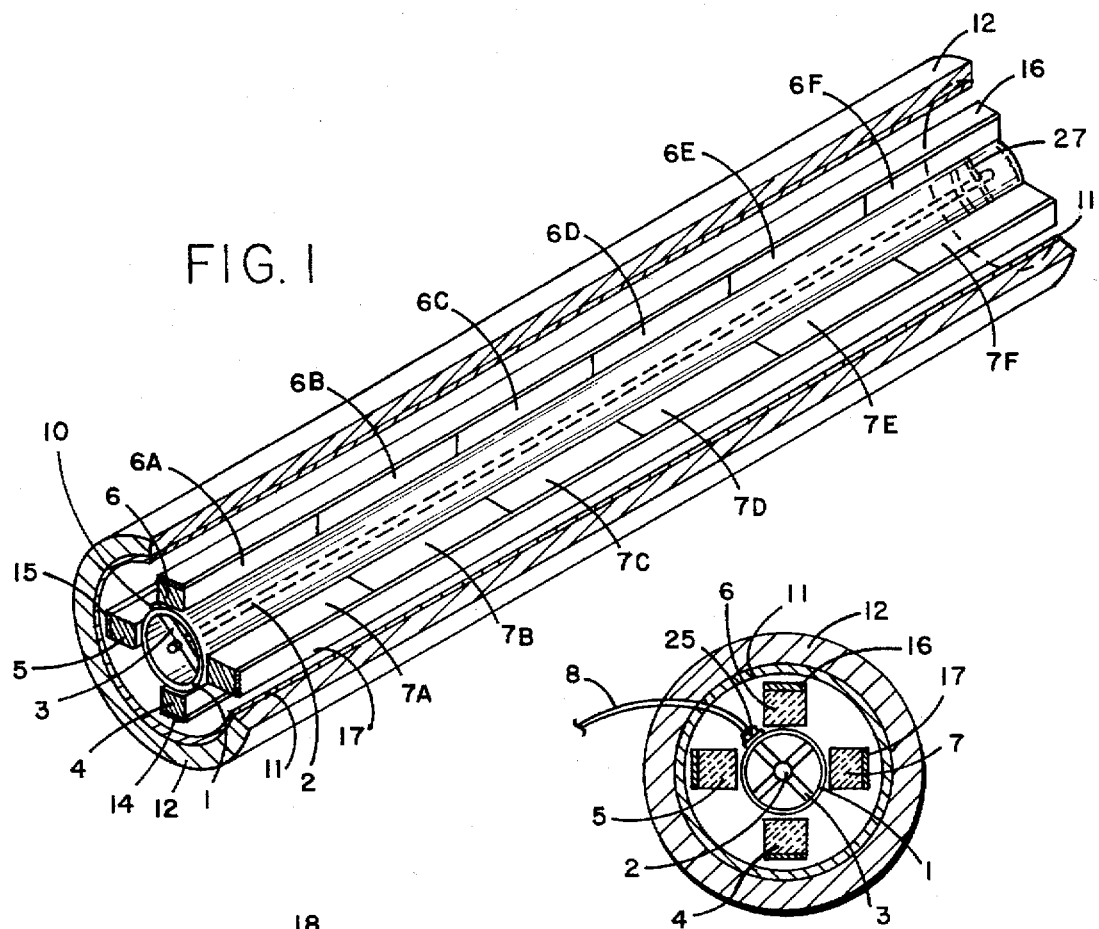
FIG. 1
FIG. 2
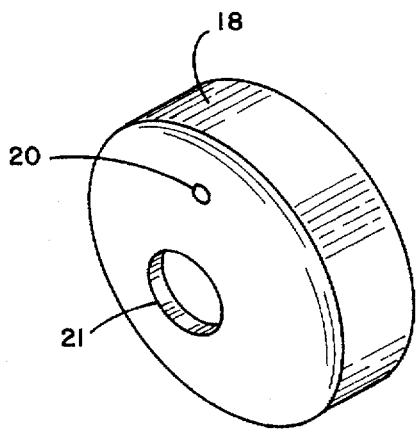
FIG. 3
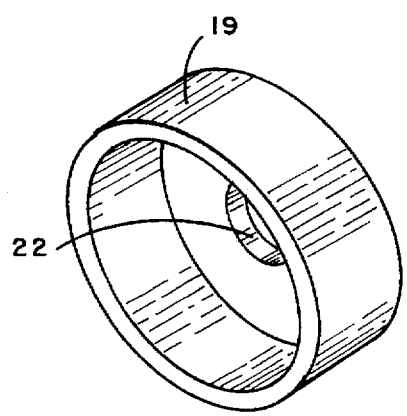
FIG. 4

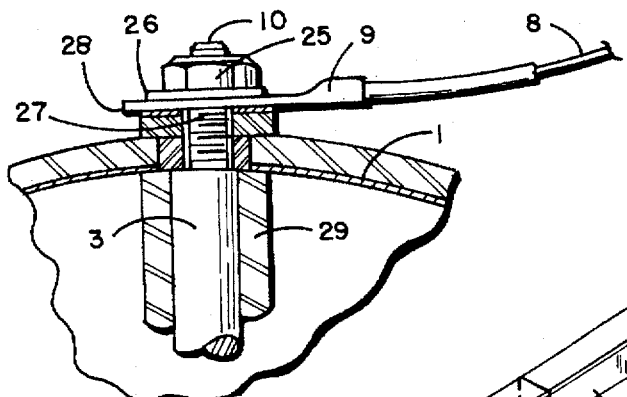
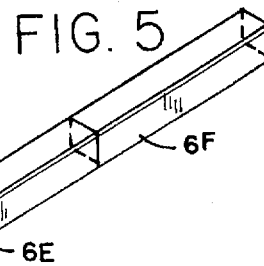
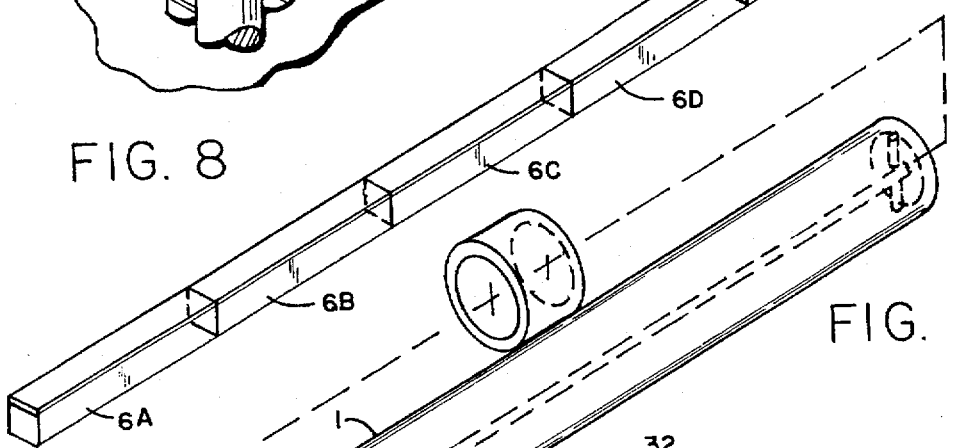
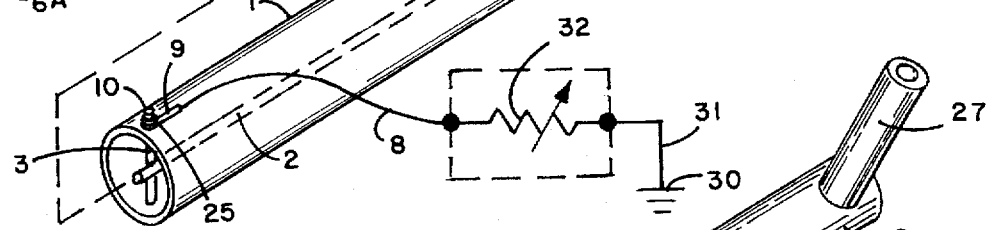
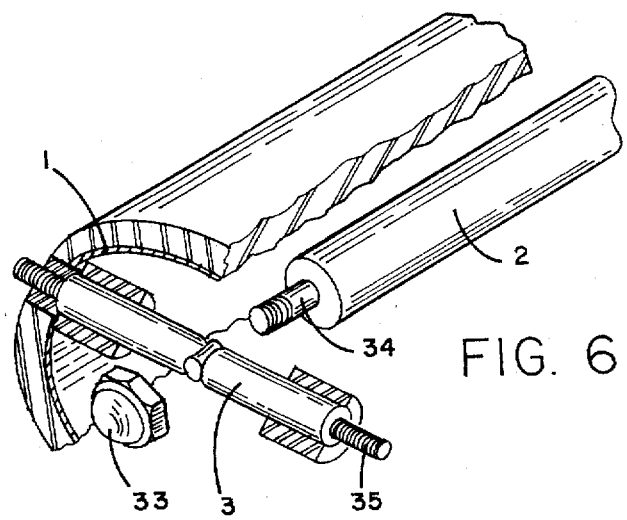

MAGNETIC FLUID CONDITIONER AND SEPARATION APPARATUS

This Application is a continuation-in-part of application Ser. No. 08/340,907 filed Nov. 15, 1994, now abandoned.

BACKGROUND OF THE INVENTION

This Invention relates to the magnetic conditioning of fluids and specifically relates to devices for separating metals and organic or inorganic materials from water or other fluids.

It is known that a magnetic flux can prevent the buildup of scale and other materials in pipes utilized to transport fluids. For example in U.S. Pat. No. 5,269,915 by Clair a magnet is placed outside a ferrous pipe for inducing a magnetic flux within the pipe for prevention of calcium carbonate on the pipe wall. The patent also describes how oil and other materials such as the precious metals cause problems in flow lines. As therein discussed, chemical treatment is expensive and necessitates collateral equipment and processes. Clair discusses deficiencies of the prior art relative to inducing a sufficient magnetic flux into the water flowing in the pipe for separation of undesirable materials from water. In the Clair patent a magnetic flux is created in an area G on the inside of the pipe utilizing magnets on the outside of the pipe. The magnetic flux ionizes the fluid and also the dissolved and suspended solids in the fluid for separation of undesirable materials.

In U.S. Pat. No. 4,755,288 by Mitchel a system is shown to create a magnetic flux within the pipe which includes cooling units for the magnets. The patent describes how many devices do not provide sufficient magnetic flux within the pipe for treatment of the water or other fluid.

In U.S. Pat. No. 5,030,344 by Ambrose there is disclosed a magnetic fluid conditioner arranged on the outside of the pipe with several magnets positioned so that the south magnetic pole faces the pipe. An elaborate system is utilized to strengthen the magnetic flux for separation of undesirable materials from water.

In U.S. Pat. No. 5,186,827 by Liberti, et al. four magnets are placed at a distance from the fluid carrying pipe for separating materials from water.

There are many other devices designed for increasing the magnetic flux within the fluid carrying pipe such as those disclosed in U.S. Pat. Nos. 4,417,985 by Keane; 5,024,759 by McGrath, et al.; 5,074,998 by Doleman, et al.; 5,198,106 by Carpenter; 5,161,512 by Adam; 5,178,757 by Corney; 5,227,683 by Clair; 5,122,277 by Jones; 4,428,837 by Kronenberg; 4,407,719 by Van Gorp; 4,552,664 by Benner and 2,652,925 by Vermeiren.

In Vermeiren, for example, the pipe is surrounded by several solenoids supplied by alternating current or direct current whereunder different solenoids have the same polarity.

As is obvious from the foregoing discussion and a simple inspection of prior art, extensive research has been conducted for the purpose of increasing the magnetic flux within the fluid carrying pipe.

Furthermore, research to date has not revealed the exact mechanism whereunder various metals and organic or inorganic materials are separated from water during the process utilizing a magnetic flux.

Accordingly, the object of the Invention is to improve the separation process whereunder a magnetic flux created inside a pipe carrying fluid for treatment. Another object of the Invention is to increase the magnetic flux within a fluid carrying pipe for separation of metals and organic or inorganic materials from water or other fluids. Further objects of the Invention will be apparent from the following discussion.

DISCLOSURE OF THE INVENTION

The Invention herein comprises a plurality of magnets placed about a fluid-carrying pipe; a core placed within the flow line of the pipe and approximately at the center line of the pipe; a controlled electrical return path, such as a metal wire or conduit, connected electrically to the core, but not in electrical contact with the pipe, and which runs to a lower electrical potential. A low reluctance shield encloses the above magnet structure. The core is supported within the pipe by one or more support pieces running from the core and to the interior of the pipe, and arranged so that the core may be easily removed from the pipe. The controlled electrical return path (CERP) is, in essence, an electrically conductive means, such as a metal piece, wire or conduit, which is in electrical contact with the core so that electrical charges of the core flow to a lower electrical potential. A preferred lower electrical potential is ground, substantially ground, or a structure such as a pipe which itself is connected electrically to ground.

As stated, the core is placed in the center line of the pipe. Such center-line is essentially in a zero gauss region. In such position there is a maximum influence by the magnetic field on the fluid flowing through the pipe.

As stated, the controlled electrical return path (CERP) is in electrical contact with the core, but not with the pipe. In one embodiment shown, the CERP is in electrical communication with a shaft which itself is in electrical communication with the core. Such shaft is electrically insulated from the pipe. Thus, there is an electrical flow from the core only through the CERP and into a lower electrical potential.

The invention also includes an embodiment whereunder the CERP is connected to a prior art variable resistor prior to contact with the lower potential so that the electrical flow to ground can be controlled and that there can be a control of the intensity of the separation.

Applicant has discovered that the magnetic field placed on the fluid within the pipe can be controlled by the variable resistor, which controls the electrical flow through the CERP.

The lower potential can be any lower potential, but is preferably ground or substantially ground or a structure such as a pipe which itself is connected electrically to the ground.

For reasons unknown to the Inventor, the CERP enhances the separation process wherein a magnetic flux is placed into fluid flowing within a pipe.

Each magnet arranged outside and about the pipe has several magnet sections. The number of magnet sections depend upon the particular application. In the embodiment herein, there are four magnet sections, each of which have six separate magnets. Each magnet is polarized so that the portion of the magnet facing the pipe is either of a north or south polarity with the portion of the magnet section facing away from the pipe is of the opposite polarity. For purposes of discussion herein, a magnet is considered north, when the portion of the magnet facing the pipe is of north polarity. A magnet is referred to herein as being south, when the portion of the magnet facing the pipe is of south polarity. Each magnet section of each magnet is either of north or south polarity (that is, the polarity of the section facing the pipe). Each magnet section has a different polarity from the adjacent section. Furthermore, each magnet section opposite to the magnet section on the other side of the pipe has the same polarity as such opposite magnet section. For example, in one embodiment, four magnets are placed about the pipe equal distance from one another. In such embodiment, each magnet has six sections. A first section is magnetically north, the second section magnetically south, the third section magnetically north, the fourth section magnetically south, the fifth section magnetically north, and the sixth section magnetically south. The magnet on the opposite side of the pipe likewise has a first section in which is magnetically north, a second adjacent section magnetically south, a third section magnetically north, a fourth section magnetically south a fifth section magnetically north, and a sixth section magnetically south. Accordingly, all magnets of a first section are magnetically north. Thus, the polarity of the magnet section opposite to each magnet is identical. Accordingly, each section has magnetic fluxes flowing between them and repelled by the magnet section on the opposite side of the pipe.

In some applications, it is preferred that the polarity of the magnet sections near the inlet where fluid enters the pipe of the Invention be north. In other applications, the magnet section near or adjacent to the inlet section is preferably south.

A shield which has a low magnetic reluctance is provided exterior to the pipe and the magnets so that magnetic fluxes do not escape from the pipe but are retained within the pipe.

As stated, it is unknown why the above-described system results in a high efficiency of removal of metals and chemicals, as well as hydro-carbon materials from water or other fluids. Prior art devices which show metal pieces within the pipe disclose no elements whereunder electron flow from such inner pieces or cores are dispelled to a lower potential such as ground.

Additionally, prior art devices do not disclose applicant's novel magnetic section arrangement whereunder sections of different polarity are made part of magnets placed about the pipe and in the arrangement described hereinabove.

In any event, the subject Invention results in a high efficiency of separation of materials from aqueous and other solutions.

THE DRAWINGS

FIG. 1 shows a cut-away and perspective view of the Invention.

FIG. 2 shows an end-view of the Invention.

FIG. 3 shows the perspective view of enclosing caps.

FIG. 4 shows a perspective view of the enclosing caps.

FIG. 5 shows a perspective view of the arrangement of the sections of a magnet.

FIG. 6 shows a schematic of the support means for the core of the Invention.

FIG. 7 shows perspective view of the CERP concept wherein the CERP is connected to a shaft which in turn is connected electrically to the core. The CERP is shown running through the variable resistor and to the lower potential, generally ground.

FIG. 8 shows a view of the CERP connected electrically to the shaft which is in turn placed in electrical communication with the core. FIG. 8 also shows the insulation so that there is no electrical contact between the CERP and the pipe.

DETAILED DESCRIPTION OF THE INVENTION

Referring now to FIG. 1, there is shown a flow pipe 1 which carries the fluid to be treated. Pipe 1 is made of any material which does not interfere with the magnetic flux created from magnets. Pipe 1 can be made of copper, stainless steel, aluminum, nylon, polyvinyl chloride, a conductive polymer and other generally recognized pipe materials, preferably stainless steel or other ferrous material.

The device of FIG. 1 is connected to fluid flow lines by generally recognized plumbing materials. Fluid flows in one end of pipe 1 from a line connected thereto and outside the opposite end of pipe 1. Thus the fluid is treated within the shown pipe 1.

A core member 2 is shown running concentrically within pipe 1. Core 2 is made of any electrically conductive material, preferably a ferrous material such as iron, or a conductive polymer, and preferably Core 2 is stainless steel. Core 2 may include an outer shell made of copper or other substantially non-corrosive material so that core 2 may be protected from corrosion threatened by an aqueous fluid contained within pipe 1. The diameter of core 2 is generally substantially less than the diameter of the pipe as depicted in FIG. 1. The diameter of the core may be 1/50th to 1/10th of that of the pipe. The core may be located in the middle of the cross-section of pipe 1 and may run concentrically within pipe 1.

Core 2 is supported within pipe 1 utilizing support bar 3 and other support bars to be discussed. Exterior to pipe 1 are four separate magnets 4, 5, 6 and 7 arranged equal distant about pipe 1. Each magnet has six separate sections. The magnet section near the pipe where the fluid enters is charged north. The next section is charged south with the next section charged north, next section south, next section north and final or exit section charged south. Each of the four magnets have the sections similarly charged.

Support bar 3 is in electrical contact with core 2. Attached to bar 3 is the novel CERP 8 of the Invention. The CERP 8 is simply an electrically conductive material such as copper, aluminum or iron which can carry electrical charge from the core 2 to a lower electrical potential such as a ground or an electrical conductive structure connected to ground 9. In some applications, the lower potential is a controlled potential so that the process may be modulated. The CERP 8 may be connected to ground 30 as shown in FIG. 7. The CERP can be connected to the core 2, or to any structure in electrical communication with core 2 such as support bar 3 or bolt 10, which is shown exterior to pipe 1.

Shield 11 is exterior to the magnets 4, 5, 6 and 7 and prevents magnetic flux or minimizes escape of magnetic flux from the exterior. Thus magnetic flux is directed towards the pipe and is not lost to the atmosphere. The shield 11 is composed of any material which has a low magnetic reluctance and which can reduce the magnetic field outside the pipe to a minimum. Suitable materials are galvanized sheet metal and the like. Exterior to the shield 11 is an outer housing 12 made of known prior art materials.

FIG. 2 shows a cross-sectional area of the Invention. It can be seen that bolt 10 helps placement of bar 3 within pipe 1 and also acts as the connecting medium for the CERP line 8. A filler material is contained within shield 11 and exterior to pipe 1 and can be composed of any suitable prior art material.

Each magnet may contain a backing strip 14, 15, 16, and 17 at its outer face area to minimize magnetic flux fields flowing towards shield 11. The backing materials may be of ferrous material such as mild steel.

FIGS. 3 and 4 show mounting caps 18 and 19 respectively for placement of the pipe 1 of FIG. 1 onto the system pipe not shown. FIG. 3 shows a hole 20 so that the novel CERP 8 connected to bar 3 or connecting bolt 10 can escape therethrough and be connected to ground. There is shown an opening 21 so that the pipe 1 can be connected therein to the piping of the system exterior to the device of the Invention. Likewise, opening 22 shown in FIG. 4 can be utilized for opposite end connection.

FIG. 5 shows a schematic view of the alternating polarity sections of a typical magnet 6. Shown are magnet sections 6a, 6b, 6c, 6d, 6e and 6f. Referring back to FIG. 1, there are shown four magnets 4, 5, 6, and 7 about pipe 1. There are shown magnet sections a, b, c, d, e, and f, each of magnets 4, 5, 6, and 7. In one embodiment each magnet section a has the same polarity. Accordingly, magnet section 4a has the same polarity as section 5a, 6a and 7a. Also, and as described, the next magnet section 6b has a different polarity. Accordingly, in one embodiment, magnet section 6a is north, section 6b is south, section 6c is north, section 6d is south, section 6e is north and section 6f is south. Likewise, section 7a is north, section 7b is south, section 7c is north, section 7c is south, section 7e is north and section 7f is south. It can be seen that the poles of opposite magnet sections have the same polarity. For example, section 4a has the same polarity as opposite magnetic section 6a. Also, magnet section 5a has the same polarity as opposite magnet section 7a. As stated, in some applications, it is preferable that the magnet sections have a north polarity near the inlet of the pipe where fluid enters. Accordingly, sections 4a, 5a, 6a and 7a would be of a north polarity. In other embodiments it is preferable that the magnet section adjacent the inlet of the pipe be of south polarity, in which case, sections 4a, 5a, 6a, and 7a would be of south polarity.

FIG. 6 shows the core 2 supported within pipe 1 utilizing support bar 3. The core 2 is placed within support 3 utilizing connecting means 34 and a nut 33.

FIG. 7 shows a schematic view of the CERP system. Line 8 is a CERP and can be any electrically conductive wire, such as a copper, ferrous or steel wire or any other electrical means whereunder electricity can flow therethrough. The CERP 8 is shown connected to a shaft 3 in FIG. 7. There is an insulating member 9 placed about the CERP 8, so that there is no electrical contact between the CERP 8 and the pipe 1. Thus, the CERP is in electrical contact with the core 2, without any electrical contact with the pipe. The CERP is then connected to a variable resistor 32. The variable resistor 32 is a standard prior art variable resistor. The CERP 8 is shown connected to ground or to a lower potential such as ground or a pipe. FIG. 7 shows the ground as 30 and a portion of the CERP 8 as line 30, shown from the variable resistor 32 and to ground 30.

FIG. 8 shows a detail front view of the connecting system wherein the CERP is connected to shaft 3, which in turn is electrically and physically connected to the Core 2. The CERP 8 is within an insulating material 9. The CERP 8 surrounds the shaft portion 3 which is bolted by Bolt 10 and Nut 25. There is a piece 9 below the Bolt 25. There is an insulating material 29 so that there is no electrical contact between the Shaft 3 and the Pipe 12. The CERP wired thus surrounds a Shaft 3 so that the CERP 8 is in electrical contact with Core 2.

Other means can be utilized to form an electrical contact with the inner core 2, as is known in the prior art.

OPERATION OF THE INVENTION

The device depicted in FIG. 1 is connected to the fluid flow line which carries the fluid for separation. Fluid for separation may be contained in the system itself or in a separate reservoir or tank. Fluid is pumped within pipe 1. The fluid which exits pipe 1 is then contained within a tank or other storage means.

The particular sizing of pipe 1 and of the magnets and other elements of the Invention can be accomplished readily by knowing the parameters of the system, the volume of materials to be separated and other recognizable features. The type of fluids which are to be treated are of numerous variety such as those disclosed in the above-described patents in prior art. Generally, however, fluids which are the subject of the separation process include those aqueous solutions containing metals and/or hydrocarbons to be treated.

The subject Invention has, in fact, been utilized to separate metals such as chromium, copper, lead and zinc from aqueous solutions to essentially non-detectable levels utilizing the device of the Invention. Additionally, the Invention has been utilized to essentially remove hydrocarbons such as ethyl benzene, toluene and methylene chloride from aqueous solutions. Generally, the fluid flows through the separation piping into a tank where the metals settle below the water and the subject hydrocarbons settle on an upper level above the water.

The foregoing composes the preferred embodiment of the Invention and the Invention is defined by the following claims:

I claim:

1. A device to separate materials from fluids, comprising:
   (a) a pipe capable of containing and permitting fluids to flow therethrough;
   (b) a plurality of magnets placed exterior to the pipe so that a magnetic flux is created within the pipe;
   (c) a core made of a ferrous or an electrically conductive metal or polymer placed concentrically within the pipe;
   (d) an electrically conductive member placed in communication with said core and to an electrical potential less than the potential of the core so that electrical charges are removed from the core; and
   (e) insulating means so that the electrically conductive member is not in electrical contact with the pipe.

2. The device of claim 1 wherein such lower electrical potential is ground.

3. The device of claim 1 including a variable resistor placed in electrical contact with the electrically conductive member and exterior to the pipe, such that such variable resistor controls the amount of electrical flow through the electrically conductive member.

4. The device of claim 3 wherein said variable resistor is connected to a line which is connected to ground.

* * * * *